T. K. BOGGS.
COTTON CHOPPER.
APPLICATION FILED JULY 22, 1909.
948,495.
Patented Feb. 8, 1910.
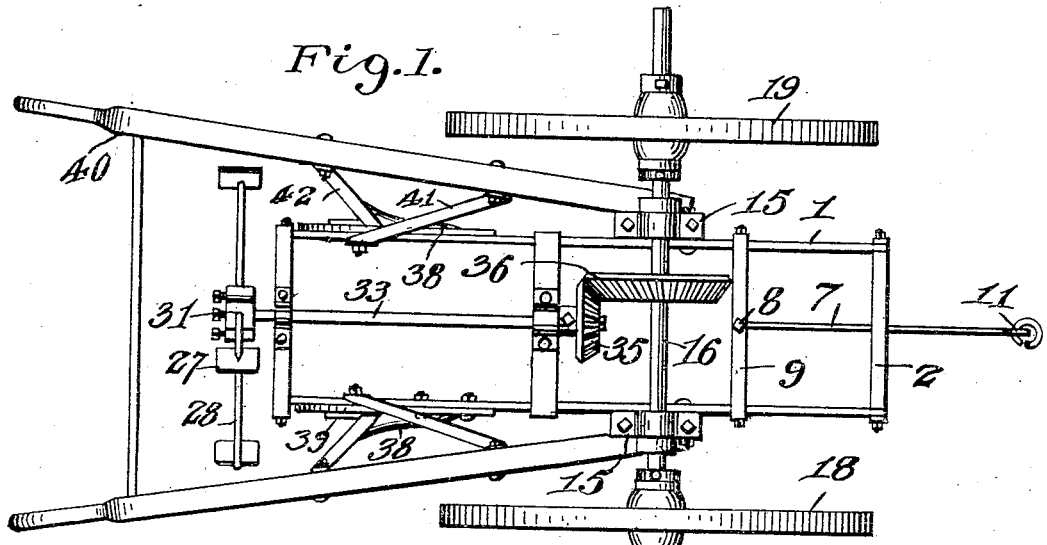
Fig. 1.
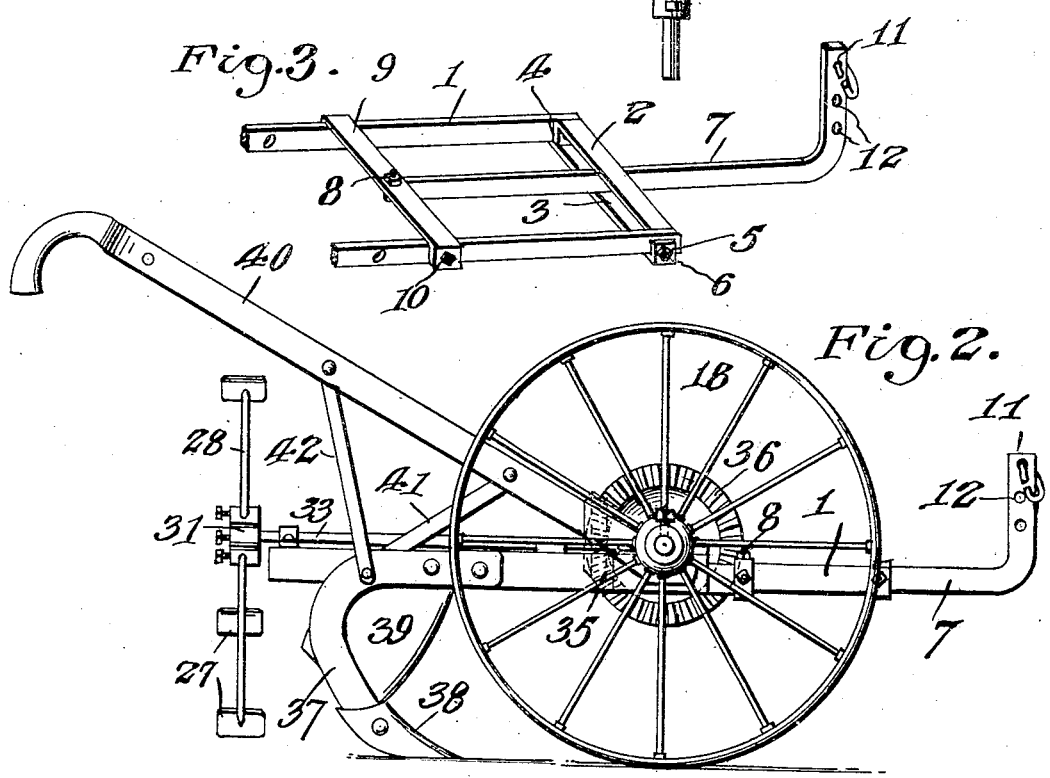
Fig. 3.
Fig. 2.
Witnesses:
Joe. P. Wahler
E. M. Ricketts
Inventor
Thomas K. Boggs
By Watson E. Coleman
Attorney

UNITED STATES PATENT OFFICE.

THOMAS KENNEDY BOGGS, OF DECATUR, ALABAMA.

COTTON-CHOPPER.

948,495.   Specification of Letters Patent.   Patented Feb. 8, 1910.

Application filed July 22, 1909. Serial No. 509,014.

*To all whom it may concern:*

Be it known that I, THOMAS K. BOGGS, a citizen of the United States, residing at Decatur, in the county of Morgan and State of Alabama, have invented certain new and useful Improvements in Cotton-Choppers, of which the following is a specification, reference being had to the accompanying drawings.

This invention relates to improvements in cotton choppers and more particularly one which may also be used as a cultivator.

The object of the invention is to provide an implement of this character having an improved frame construction and draft bar, whereby it may be easily guided and maintained in the row even though the draft animals do not travel in a straight line.

With the above and other objects in view, the invention consists of the novel features of construction and the combination and arrangement of parts hereinafter fully described and claimed, and illustrated in the accompanying drawings, in which—

Figure 1 is a plan view of my improved cotton chopper; Fig. 2 is a side elevation; and Fig. 3 is a detail perspective view of the improved frame construction and swinging draft bar.

The improved implement or machine consists of two longitudinal side bars 1 united at their front ends by upper and lower cross bars 2, 3 which are spaced apart and of substantially U-shape. The upper bar 2 has downturned ends 4 engaged with the opposing inner faces of the side bars or beams 1 and the lower bar 3 has upwardly extending ends 5 engaged with the outer faces of said bars 1. Transverse bolts or similar fastenings 6 are passed through the parts 4, 1, 5 to unite them and hold the bars 2, 3 in spaced relation. These bars serve as supports and guides for a horizontally swinging draft tongue or bar 7, the rear end of which is mounted on a vertical pivot 8 arranged in an intermediate cross bar 9. The latter is also of U-shape and has downturned ends 10 engaged with the outer faces of the bars 1 and bolted or otherwise secured thereto, as clearly shown in Fig. 4 of the drawings. The forward end of the draft bar 7 is bent to form an upwardly projecting arm 11 having a longitudinal series of apertures 12 in any of which may be engaged the connection for the doubletree or other draft device. The side bars 1 of the frame are also connected by a second intermediate cross bar 13 and a rear cross bar 14, as shown more clearly in Fig. 1.

15 denotes bearings arranged on the side bars 1 for the axle 16, which latter carries supporting and driving wheels 18, 19.

27 denotes chopping hoes arranged on arms 28 radiating from a hub 31 on a longitudinal shaft 33 suitably journaled on the rear portion of the frame. Meshing beveled gears 35, 36 connect the shaft 33 to the axle 16.

38 denotes hoes arranged on standards depending from the side bars of the frame and 39 denotes fender plates.

40 denotes handle bars supported by braces 41, 42 and having their lower forward ends connected to the forward portions of the side bars.

From the foregoing description taken in connection with the drawings it is thought that the construction, operation and advantages of the invention will be readily understood.

Having thus described the invention what is claimed is:

The combination of a frame having side bars connected at their rear ends, an intermediate connecting bar having downturned ends secured to the outer faces of said side bars, upper and lower front connecting bars, said upper front bar having downturned ends engaged with the inner faces of the side bars, and said lower front bar having upturned ends engaged with the outer faces of said side bars, transverse fastenings passed through the side bars and the ends of said upper and lower bars, and a horizontally swinging draft bar arranged between said upper and lower front bars and having its rear end pivoted to said intermediate connecting bar, the front end of said draft bar being upturned and apertured to form a clevis.

In testimony whereof I hereunto affix my signature in the presence of two witnesses.

THOMAS KENNEDY BOGGS.

Witnesses:
  J. R. DOSS,
  S. W. IRWIN.